(12) United States Patent
Lefebvre et al.

(10) Patent No.: US 11,460,037 B2
(45) Date of Patent: Oct. 4, 2022

(54) BEARING HOUSING (71) Applicant: PRATT & WHITNEY CANADA CORP., Longueuil (CA)

(72) Inventors: Guy Lefebvre, St-Bruno-de-Montarville (CA); John Pietrobon, Outremont (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 222 days.

(21) Appl. No.: 16/369,841

(22) Filed: Mar. 29, 2019

(65) Prior Publication Data

US 2020/0309143 A1 Oct. 1, 2020

(51) Int. Cl.
*F04D 29/042* (2006.01)
*F01D 25/16* (2006.01)
*F01D 25/18* (2006.01)
*F04D 29/52* (2006.01)

(52) U.S. Cl.
CPC ......... *F04D 29/042* (2013.01); *F01D 25/162* (2013.01); *F01D 25/18* (2013.01); *F04D 29/52* (2013.01); *F05D 2240/52* (2013.01)

(58) Field of Classification Search
CPC .... F01D 25/162; F01D 25/164; F04D 29/056; F16C 27/066; F16C 35/067; F16C 35/077
See application file for complete search history.

(56) References Cited

U.S. PATENT DOCUMENTS

| | | | |
|---|---|---|---|
| 3,486,686 A * | 12/1969 | Williamson | F02C 3/02 60/39.45 |
| 5,080,555 A | 1/1992 | Kempinger | |
| 6,511,284 B2 | 1/2003 | Darnell et al. | |
| 7,448,808 B2 | 11/2008 | Bouchy et al. | |
| 7,493,769 B2 | 2/2009 | Jangili | |
| 7,568,843 B2 * | 8/2009 | Lefebvre | F01D 25/162 184/6.11 |
| 7,644,572 B2 | 1/2010 | Labala | |
| 7,900,456 B2 | 3/2011 | Mao | |
| 7,946,809 B2 | 5/2011 | Meier et al. | |
| 8,631,637 B2 | 1/2014 | DeDe et al. | |
| 8,641,362 B1 | 2/2014 | Liang | |
| 8,894,359 B2 | 11/2014 | Munshi et al. | |
| 9,109,510 B2 | 8/2015 | Hashimoto | |
| 9,151,226 B2 | 10/2015 | Zimmermann et al. | |

(Continued)

FOREIGN PATENT DOCUMENTS

| | | |
|---|---|---|
| AU | 2014259469 A1 | 11/2015 |
| CA | 2354261 C | 12/2007 |

(Continued)

OTHER PUBLICATIONS

European Search Report issued in European Patent Application No. 20166844.9-1009 dated Sep. 7, 2020.

*Primary Examiner* — Woody A Lee, Jr.
*Assistant Examiner* — Cameron A Corday
(74) *Attorney, Agent, or Firm* — Norton Rose Fulbright Canada LLP (57) ABSTRACT

There is disclosed a gas turbine engine including a bearing housing having at least two bearings axially spaced from one another relative to a central axis. The bearing housing includes an axially deformable bellows between the bearings configured to permit axial relative movement of the bearings. A method of operating a bearing assembly is also disclosed.

20 Claims, 5 Drawing Sheets

(56) References Cited

U.S. PATENT DOCUMENTS

| | | |
|---|---|---|
| 9,435,225 B2 | 9/2016 | Duval et al. |
| 9,447,817 B2 | 9/2016 | Gallimore et al. |
| 9,458,856 B2 | 10/2016 | Keegan |
| 9,932,986 B2 | 4/2018 | DiBenedetto |
| 9,986,310 B2 | 5/2018 | Sobanski et al. |
| 10,006,306 B2 | 6/2018 | Scott et al. |
| 10,294,807 B2 | 5/2019 | Kington et al. |
| 10,364,705 B2 | 7/2019 | Harris et al. |
| 10,392,939 B2 | 8/2019 | McKay et al. |
| 10,400,787 B2 | 9/2019 | Bertoneri et al. |
| 2011/0123326 A1* | 5/2011 | DiBenedetto ............ F02C 7/06 415/229 |
| 2015/0354382 A1 | 12/2015 | Pakkala et al. |
| 2017/0234157 A1 | 8/2017 | Khan et al. |
| 2017/0241295 A1 | 8/2017 | Konishi et al. |
| 2017/0284225 A1 | 10/2017 | Hashimoto |
| 2018/0266276 A1 | 9/2018 | Phillips |
| 2018/0320552 A1* | 11/2018 | Harris .................... F01D 25/16 |

FOREIGN PATENT DOCUMENTS

| | | |
|---|---|---|
| CA | 2776318 C | 4/2013 |
| CA | 2792750 A1 | 4/2013 |
| CA | 2958347 A1 | 8/2017 |
| CA | 2715227 C | 11/2017 |
| CA | 2824292 C | 1/2019 |
| CA | 2797299 C | 1/2020 |
| CN | 102109865 B | 7/2012 |
| CN | 205036457 U | 2/2016 |
| CN | 105518259 A | 4/2016 |
| CN | 108625984 A | 10/2018 |
| DE | 19648641 A1 | 5/1998 |
| EP | 914543 B1 | 10/2001 |
| EP | 1913237 B1 | 6/2013 |
| EP | 3306116 A1 | 4/2018 |
| EP | 2821657 B1 | 7/2018 |
| EP | 3453849 A2 | 3/2019 |
| EP | 3495626 A1 | 6/2019 |
| EP | 3524806 A1 | 8/2019 |
| EP | 2938863 B1 | 9/2019 |
| EP | 3546704 A2 | 10/2019 |
| EP | 3546704 A3 | 12/2019 |
| FR | 2971002 A1 | 8/2012 |
| JP | 2017150480 A | 8/2017 |
| WO | 2018146405 A1 | 8/2018 |
| WO | 2019239033 A1 | 12/2019 |

\* cited by examiner

BEARING HOUSING

TECHNICAL FIELD

The application relates generally to gas turbine engines and, more particularly, to bearing housing assemblies used in such engines.

BACKGROUND OF THE ART

In a gas turbine engine, a rotary shaft holding compressor/fan and turbine blades is rotatably mounted within a casing via bearings. The bearings are typically located radially inwards relative to the annular flow path formed by duct walls of the casing. A bearing housing usually encloses the bearings and defines a bearing cavity for receiving lubricant for lubricating the bearings. Due to the forces inherent to gas turbine engine operation, and as they are the interface between shafts and a support structure, the bearings are exposed lo loads, vibrations, etc that may affect their performance over time.

SUMMARY

In one aspect, there is provided a bearing assembly for a gas turbine engine comprising at least two bearings being axially spaced from one another relative to a central axis and configured to rotatably support a rotating component of the gas turbine engine, and a bearing housing configured to be secured to a casing of the gas turbine engine, the bearing housing including a case extending at least axially relative to the central axis and extending circumferentially around the central axis, bearing supports at axially spaced apart locations of the case, the bearing supports radially supporting the at least two bearings, wherein the case includes an axially deformable bellows between the bearing supports configured to permit axial relative movement of the bearings.

In another aspect, there is provided a gas turbine engine comprising a bearing housing having at least two bearings axially spaced from one another relative to a central axis, the bearing housing including an axially deformable bellows between the bearings configured to permit axial relative movement of the bearings.

In yet another aspect, there is provided a method of operating a bearing assembly, comprising: supporting at least two bearings being axially spaced apart relative to a central axis; receiving a first axial load at least at one of the at least two bearings and receiving a second axial load greater than the first axial load at the other of the at least two of the bearings; deforming bellows by axially moving the at least two bearings relative to one another relative to the central axis as a result of a difference between the first axial load and the second axial load.

DESCRIPTION OF THE DRAWINGS

Reference is now made to the accompanying figures in which.

DETAILED DESCRIPTION

Figure 1:
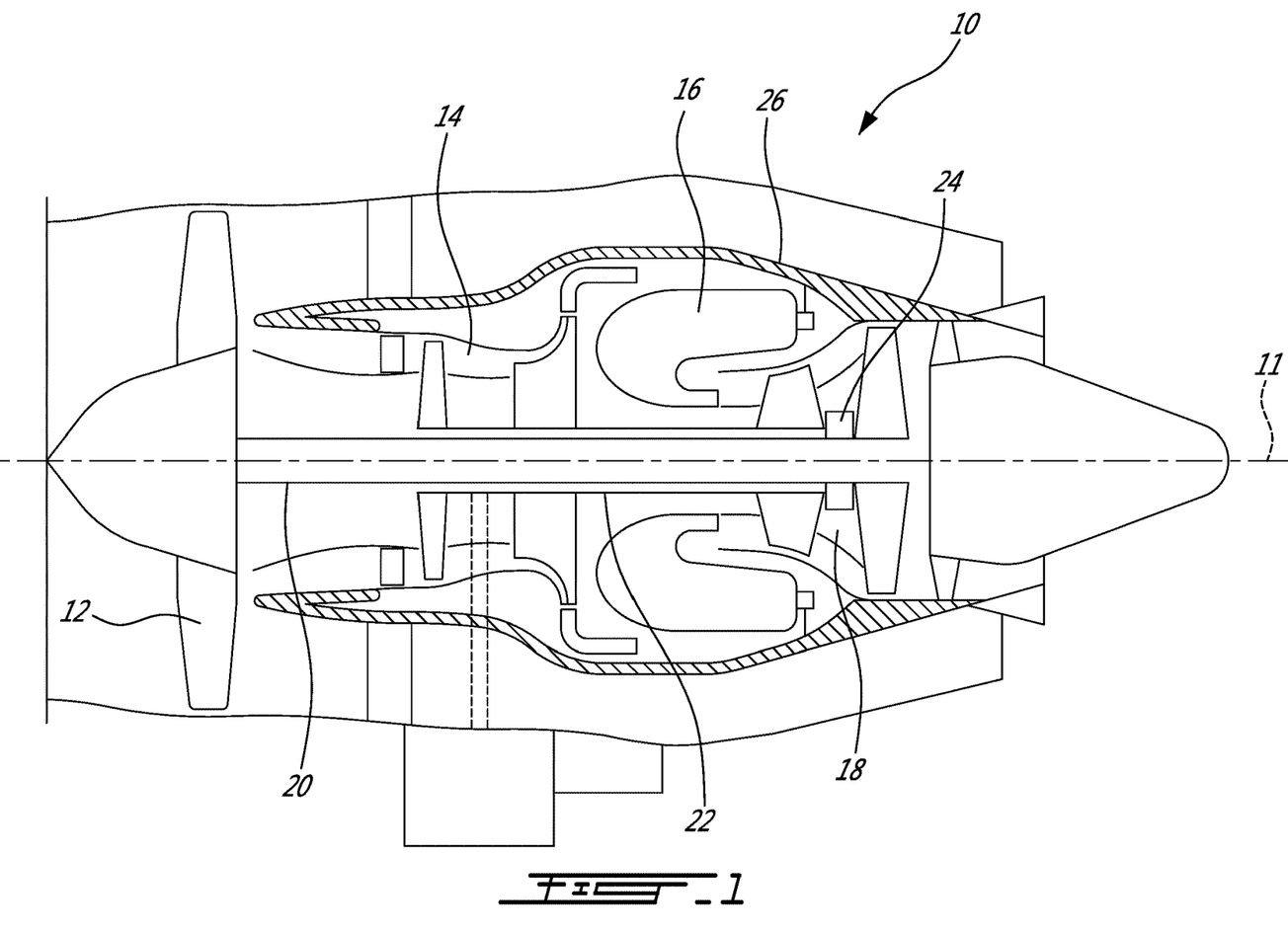
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11.

The compressor section 14, fan 12 and turbine section 18 have rotating components which can be mounted on one or more shafts 20, 22, which, in this embodiment, rotate concentrically around the central axis 11. Bearings 24 are used to provide smooth relative rotation between a shaft (20 or 22) and casings 26, 28 (FIG. 2), and/or between the two shafts 20, 22 which rotate at different speeds.

Figure 2:
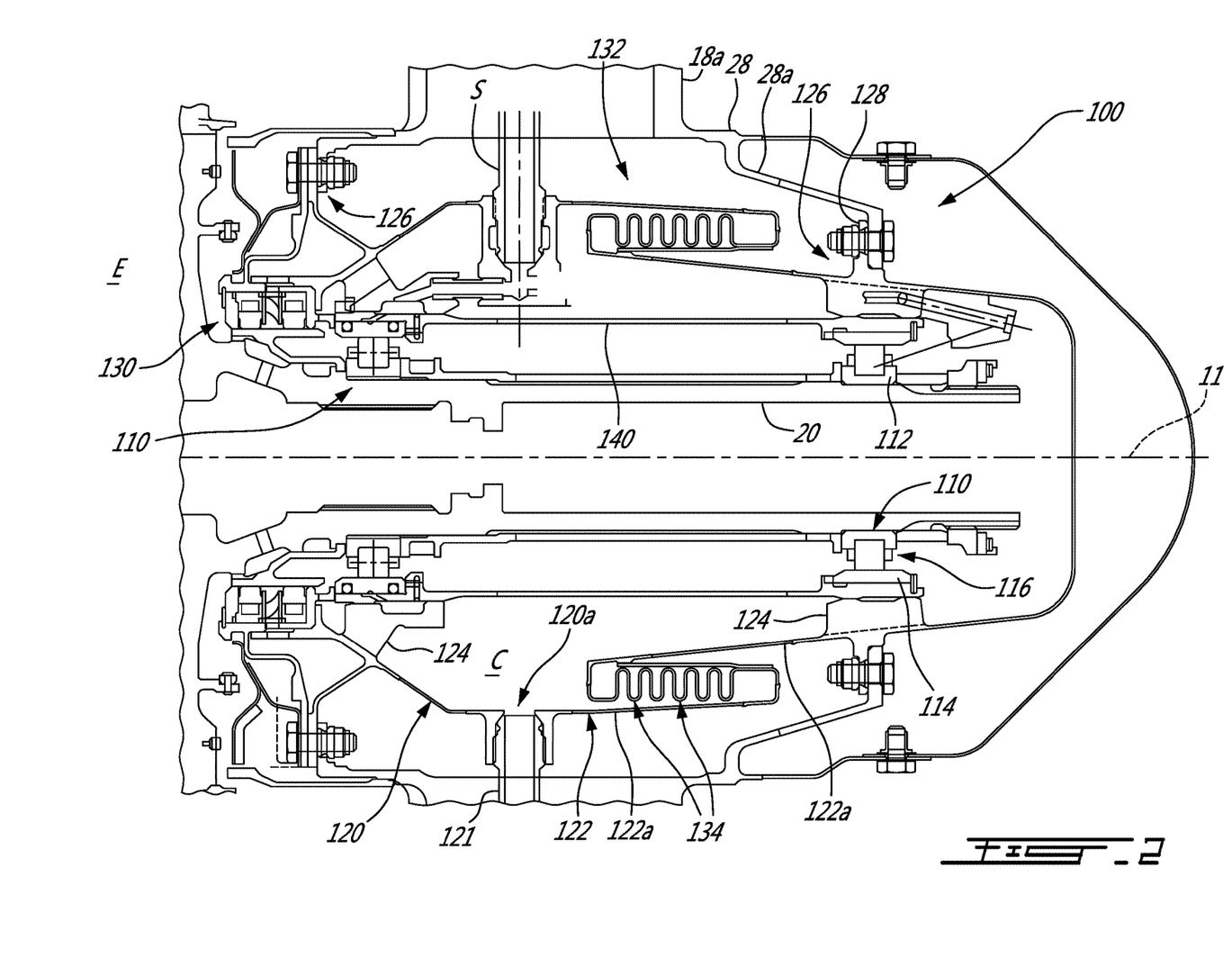
FIG. 2 is a schematic cross-sectional view of a portion of the gas turbine engine of FIG. 1 in accordance with one embodiment.
Figure 3:
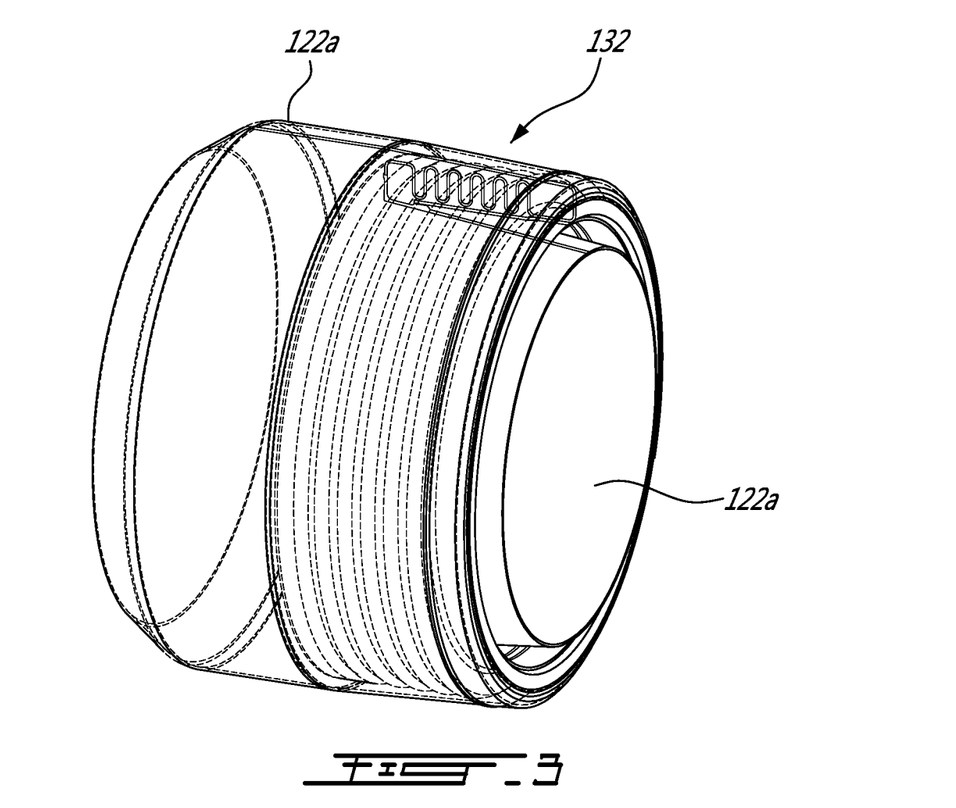
FIG. 3 is a schematic three-dimensional partially transparent view of a bearing housing for the gas turbine of FIG. 1 in accordance with one embodiment.
Figure 4:
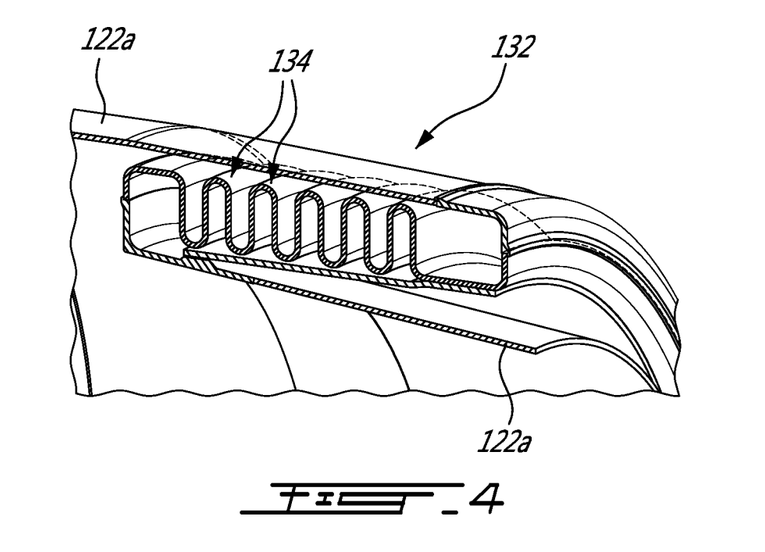
FIG. 4 is a schematic enlarged cross-sectional view of a portion of the bearing housing shown in FIG. 3

Referring now to FIG. 2, a cross-sectional view of a portion of the turbine section 18 is illustrated. A bearing assembly is generally shown at 100. The bearing assembly 100 is located radially inwardly of vanes 18a of the turbine section 18 relative to the central axis 11.

The bearing assembly 100 includes at least two bearings 110 and a bearing housing 120 enclosing the bearings 110. The bearing housing 120 is used for defining a bearing cavity C circumferentially extending around the axis 11. The bearing cavity C is used for receiving lubricant from a lubrication system S for lubricating the bearings 110. The bearings 110 and the bearing housing 120 are described in succession herein below. The lubrication system S may include a scavenge conduit 121 for scavenging lubricant from the bearing cavity C. The scavenging conduit 121 is fluidly connected to the bearing cavity C via an aperture 120a defined through the bearing housing 120. The aperture 120a may be located at a bottom section of the bearing housing 120 such that lubricant flows in the scavenge conduit 121 via gravity.

Still referring to FIG. 2, two bearings 110 are shown and are axially offset from each other relative to the central axis 11. It is understood that the gas turbine engine 10 may include more than two bearings. For the sake of clarity, only one of the two bearings 110 is described herein below using the singular form, but the description may apply to both of the bearings 110. In the embodiment shown, the two bearings 110 are axially spaced apart by more than a diameter of the shaft 22. An axial distance between the bearings 110 may be greater than a chord length of the vanes 18a of the turbine section 18.

The bearing 110 is used to allow a rotation of the shaft 20 relative to the bearing housing 120 and to substantially maintain a radial position of the shaft 20 relative to the casing 28 of the gas turbine engine 10. The bearing 110 may include an inner race 112 secured to the shaft 20, either directly or via a runner, an outer race 114 secured to the bearing housing 120 and/or rolling elements 116 located radially between the inner and outer races 112, 114. The rolling elements 116 may be spherically, cylindrically, frustoconically shaped, among examples. Any suitable bearing known in the art may be used.

Since the shaft 20 may rotate at a relatively high speed relative to the casing 28, proper lubrication of the bearings 110 may be required. As aforementioned, the lubrication system S injects the lubricant within the bearing cavity C. It might be desirable to keep the lubricant within the bearing cavity C. This function may be carried by the bearing housing 120 and sealing members 130. The sealing members 130 may be located radially between the bearing housing 120 and the shaft 20. In the embodiment shown, a runner is secured to the shaft and the sealing members 130 may define a sealing interface between said runner and a sealing element of the sealing members 130. The sealing element may be, for instance, a ring circumferentially extending all around the central axis 11. The sealing member 130 may be a controlled gap seal or a contacting seal such as a carbon seal. Any suitable seal may be used.

In the depicted embodiment, the bearing housing 120 includes a case 122, also referred to as a wall, that circumferentially extends all around the central axis 11. The case 122 extends at least axially relative to the axis 11 and may span a distance between the two bearings 110.

Bearing supports 124, two in the depicted embodiment but more notably if more bearings are present, may be secured at axial extremities of the case 122. Each of the bearing supports 124 is in engagement with a respective one of the outer races 114 of the bearings 110. The bearing supports 124 are stiffer than the case 122 to be able to withstand loads applied thereto from the shaft 22 via the bearings 110. In the embodiment shown, a radial thickness of the bearing supports 124 is greater than that of the case 122. The bearing supports 124 and the case 122 may be monolithic.

The bearing housing 120 further includes securing members 126 for attaching the bearing housing 120 to the casing 28 of the gas turbine engine 10. In the embodiment shown, the securing members 126 are flanges 128 extending radially outwardly from the case 122. The flanges 128 may extend circumferentially all around the central axis 11. In other words, the flanges 128 may be annular walls. Securing members 126 may have other configurations, such as tabs, non-flange annular walls, an annular bracket, etc.

The securing members 126 are configured to be secured to connecting members 28a extending at least radially inwardly from the casing 28. In the embodiment shown, fasteners are used to secure the securing members 126 (e.g., the flanges 128) to the connecting members 28a of the engine casing 28. Other fixation means are contemplated. The flanges 128 may be axially aligned with the bearing supports 124 relative to the central axis 11. This might allow for a greater stiffness of the bearing supports 124 than if the flanges 128 were axially offset from the bearing supports 124.

A squirrel cage 140 may be provided. The squirrel cage 140 may be used to offer radial flexibility between the two bearings 110. In the depicted embodiment, portions of the squirrel cage 140 are located at a radial distance between the outer races 114 of the bearings 110 and the bearing supports 124 of the bearing housing 120. A central section of the squirrel cage 140 may include a plurality of circumferentially distributed members. Gaps may be present between the members.

In some cases, it might be advantageous to vary the stiffness of the two bearing supports 124 of the bearing housing 120. However, increasing the stiffness of one of the bearing supports 124 may indirectly increase that of the other. Moreover, if the two bearing supports 124 of the bearing housing 120 vary in their respective stiffness, they might react differently to temperature variation. In other words, if the bearing housing 120 were installed in the turbine section 18, one of the two bearing supports 124 might be subjected to more or less thermal expansion than the other which might create thermal stresses. This phenomenon may be enhanced by the high temperature gradients in the turbine section 18. More specifically, the casing 28 might be more affected to the temperature of exhaust gases circulating in the turbine section 18 than the bearing housing 120 as the casing 28 is closer to the exhaust gases. This might create thermal stress.

Referring to FIGS. 2-6, an expansion joint is shown generally at 132. The expansion joint 132 might be able to cater to the variation in thermal expansion. The expansion joint 132 is located between the two bearing supports 124 and may provide an axial degree of expansion and/or contraction to the bearing housing 120 relative to the central axis 11.

In the embodiment shown, the expansion joint 132 includes one or more bellows 134 that is axially distributed along the central axis 11. The bellows 134 may extend circumferentially all around the central axis 11. In other words, the bellows 134 may be annular. As shown, the bellows has a corrugated section 134', with reciprocating folds or "pleats". In this example, five pleats are used in the bellows 134. More or less pleats may be used depending of the configuration, the degree of axial expansion required, and of a plurality of geometric parameters and material properties of the bearing housing 120. The bellows 134 might offer the axial degree of expansion and/or contraction of the case 122 relative to the central axis 11. In other words, the case 122 is axially deformable relative to the central axis 11 at the bellows 134.

The case 122 includes two case sections 122a each extending toward the other from a respective one of the bearing supports 124. The bellows 134 is located between the two case sections 122a such that the two case sections 122a are connected to one another via the bellows 134.

In the embodiment shown, the expansion joint 132, including the bellows 134, is located radially between the two case sections 122a relative to the central axis 11. Alternatively, the expansion joint 132 may be located axially between the two case sections 122a.

In the depicted embodiment, the two case sections 122a axially overlap each other and the expansion joint 132 is axially aligned with overlapping portions of the two case sections 122a. Therefore, in the embodiment shown, a size of the overlap between the two case sections 122a increases with a decrease of an axial distance relative to the central axis 11 between the two bearing supports 124.

Figure 5:
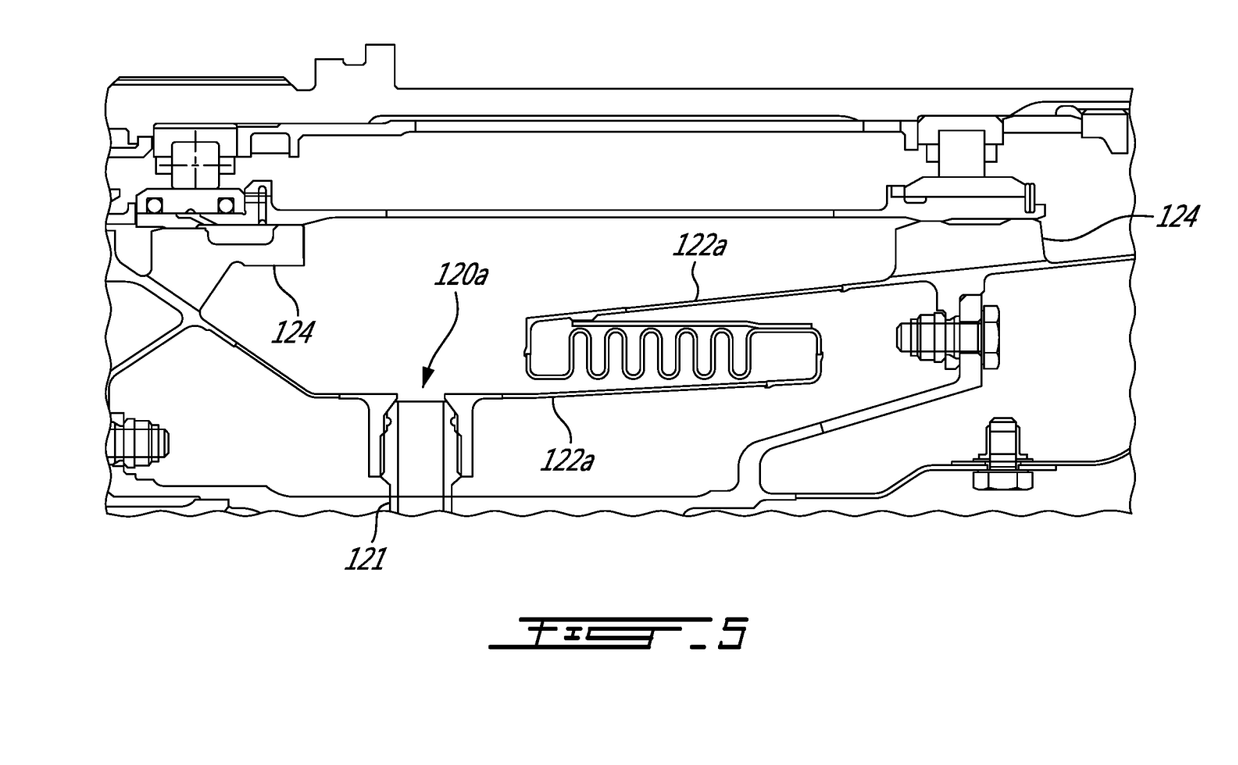
FIG. 5 is an enlarged view of a portion of FIG. 2.
Figure 6:
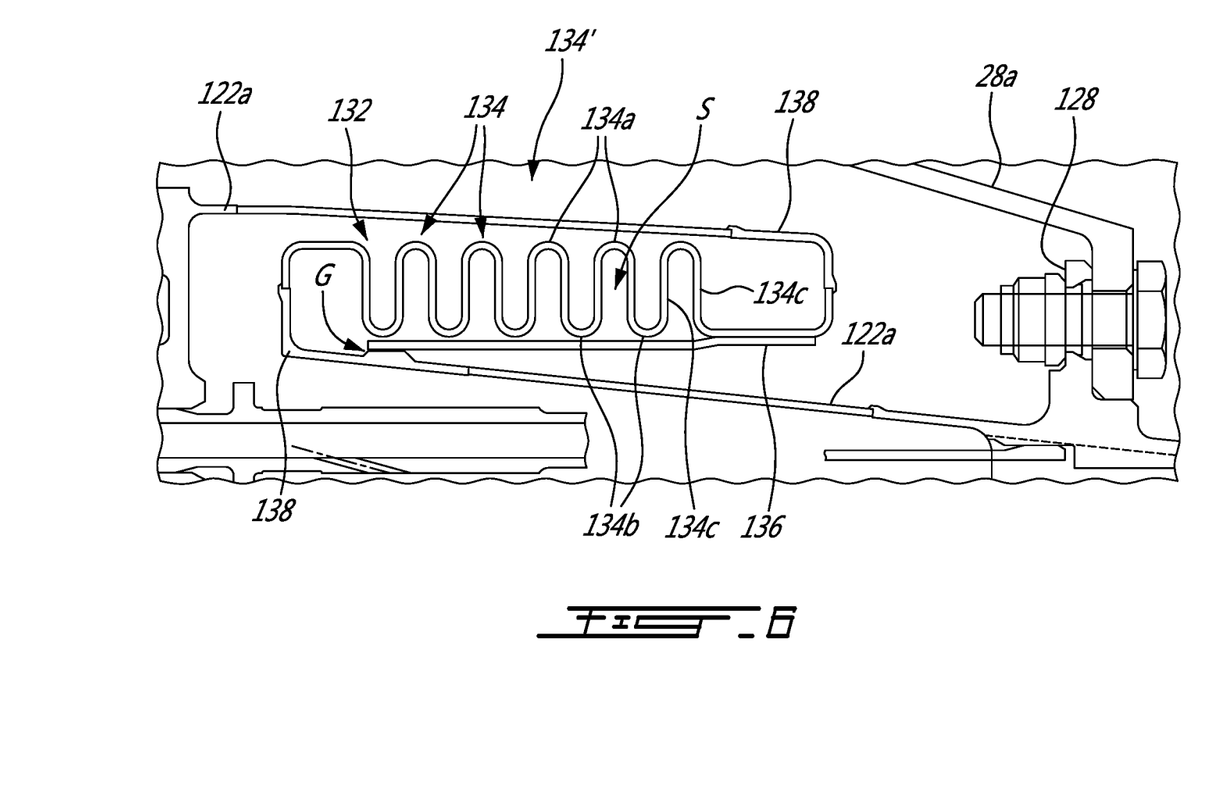
FIG. 6 is an enlarged view of a portion of FIG. 5.

Referring now to FIGS. 5-6, at the overlap between them, each of the two case sections 122a slopes radially outwardly relative to the central axis 11 toward the aperture 120a. Therefore, by gravity, the lubricant upon contact with either of the case sections 122a slopes away from the axis 11 and flows naturally toward the aperture 120a. This configuration might avoid lubricant from being trapped by the bellows 134.

More specifically, one of the two case sections 122a is located radially outwardly of the bellows 134 and the other of the two case sections 122a is located radially inwardly of the bellows 134. The one of the two case sections 122a that is located radially outwardly of the bellows 134 defines the aperture 122a.

Referring more particularly to FIG. 6, the corrugated sections 134' is defined by axially distributed crests 134a and valleys 134b that are disposed in alternation (e.g., crest, valleys, crest, etc.). In other words, the bellows 134 includes a plurality of axially distributed annular walls 134c extending from radially inner ends to radially outer ends thereof. The annular walls 134c are interconnected to one another in alternation at their radially inner and outer ends. In other words, a given one of the annular walls 134c is connected at each of its radially inner and outer ends to a respective one of two adjacent annular walls 134c that are disposed on both of its sides.

In the embodiment shown, each of the annular walls 134c is connected to a crest 134a at its radially outer end and to a valley 134b at its radially inner end. Gaps or spacing D are defined between each two adjacent ones of the annular walls 134c. The gaps D are variable in size to cater to thermal expansion mismatch between the bearing supports 124.

Still referring to FIG. 6, the bearing assembly 100 further includes a guiding member, or guide, 136 configured to guide axial compression/expansion of the expansion joint 132. The guide 136 may be a cylindrical guide extending annularly all around the central axis 11. In the depicted embodiment, the guide 136 is secured at one end thereof to one of the two case sections 122a, either directly or via a portion of the expansion joint 132, and axially overlaps the bellows 134. The other end of the guide 136 is in sliding engagement with the other of the two case sections 122a to allow expansion/compression of the expansion joint 132.

As shown in FIG. 6, a gap G is defined between the other end of the guide 136 and the other of the two case sections 122a. The gap G may be a controlled gap configured to accept axial displacement of the other of the two case sections 122a relative to the guide 136.

Connectors 138 may be used to secure the expansion joint 132 to the case sections 122a. As shown in FIG. 6, each of the two case sections 122a is secured to the expansion joint 132 via a respective one of two connectors 138. The connectors 138 may be used as a transition between the case sections 122a and the expansion joint 132. The connectors 138 may be made of sheet metal and may be welded to the case sections 122a and to the expansion joint 132. In a particular embodiment, the connectors 138 may be avoided by securing, by welding for example, the expansion joint 132 directly to the case sections 122a. The expansion joint 132 and/or the case sections 122a may define corners that are defined by the connectors 138 in the embodiment shown.

For operating the bearing assembly 100, at least two bearings 110 are supported; a first axial load is received at least at one of the at least two bearings 110 and receiving a second axial load greater than the first axial load at the other of the at least two of the bearings 110; the at least one bellows is deformed by axially moving the at least two bearings relative to one another relative to the central axis as a result of a difference between the first axial load and the second axial load. The first and second axial loads may be created by thermal expansion mismatch. In the embodiment shown, deforming the at least one bellows 134 includes increasing a size of an overlap between two case sections 122a of the case 122.

The herein disclosed bearing assembly 100 might allow for differential thermal displacement and might cater for multiple hairpin connections (e.g., flanges 128) that support multiple main shaft bearings 24, 110 in a single bearing housing 120. The disclosed bearing assembly 100 might allow to adjust the stiffness of each of the bearing supports 124 without affecting the other bearing supports 124 within a common bearing housing 120. This might allow mechanical designers to better meet any main shaft dynamic requirements than a configuration lacking the above described expansion joint 132.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A bearing assembly for a gas turbine engine having an annular gas path extending around a central axis, comprising at least two bearings being axially spaced from one another relative to the central axis and configured to rotatably support a rotating component of the gas turbine engine, and a bearing housing configured to be secured to a casing of the gas turbine engine, the bearing housing including a case extending at least axially relative to the central axis and extending circumferentially around the central axis, bearing supports secured to the case at axially spaced apart locations of the case, the bearing supports radially supporting the at least two bearings, wherein the case includes an axially deformable bellows between the bearing supports configured to permit axial relative movement of the bearings and to permit axial expansion and/or axial contraction of the case relative to the central axis, the bearing supports secured to one another via the axially deformable bellows of the case, the axially deformable bellows located radially inwardly of the annular gas path relative to the central axis.

2. The bearing assembly of claim 1, wherein the bellows has a corrugated section defined by axially distributed crests and valleys circumferentially extending around the central axis.

3. The bearing assembly of claim 1, wherein the bellows includes a plurality of axially distributed annular walls interconnected to one another, each of the plurality of axially distributed annular walls spaced apart from each other by gaps, the gaps variable in size.

4. The bearing assembly of claim 1, wherein the case includes two case sections each extending from a respective one of the bearing supports toward the other of the bearing supports, the bellows located between the two case sections such that the two case sections are connected to one another via the bellows.

5. The bearing assembly of claim 4, wherein the bellows is located radially between the two case sections relative to the central axis.

6. The bearing assembly of claim 5, wherein one of the two case sections is located radially outwardly of the bellows and the other of the two case sections is located radially inwardly of the bellows, both of the two case sections sloping radially outwardly toward an aperture defined by the bearing housing.

7. The bearing assembly of claim 4, further comprising a guide secured to one of the two case sections and being in a sliding engagement with the other of the two case sections, the guide axially overlapping the bellows.

8. The bearing assembly of claim 1, wherein the case defines an aperture fluidly connectable to a lubricant circuit of the gas turbine engine for scavenging lubricant, the case sloping radially outwardly from the bearing supports to the aperture.

9. The bearing assembly of claim 1, wherein the case extends circumferentially all around the central axis to enclose a bearing cavity radially inwardly of the case.

10. A gas turbine engine comprising an annular gas path extending around a central axis, a bearing housing having at least two bearings axially spaced from one another relative to the central axis, the bearing housing including at least two bearing supports each supporting a respective one of the at least two bearings, the at least two bearing supports connected to one another via a case of the bearing housing, the case located radially inwardly of the annular gas path relative to the central axis, the case defining an axially deformable bellows between the bearing supports, the axially deformable bellows configured to permit axial relative movement of the bearings and to permit axial expansion and/or axial contraction of the case relative to the central axis, the at least two bearing supports secured to one another via the axially deformable bellows of the case.

11. The gas turbine engine of claim 10, wherein the bellows has a corrugated sections defined by axially distributed crests and valleys circumferentially extending around the central axis.

12. The gas turbine engine of claim 10, wherein the bellows includes a plurality of axially distributed annular walls interconnected to one another in alternation at their inner diameters or their outer diameters, each of the plurality of axially distributed annular walls spaced apart from each other by gaps, the gaps variable in size.

13. The gas turbine engine of claim 10, wherein the case includes two case sections, the bellows located between the two case sections such that the two case sections are connected to one another via the bellows.

14. The gas turbine engine of claim 13, wherein the bellows is located radially between the two case sections relative to the central axis.

15. The gas turbine engine of claim 14, wherein one of the two case sections is located radially outwardly of the bellows and the other of the two case sections is located radially inwardly of bellows, both of the two case sections sloping radially outwardly toward an aperture defined the bearing housing.

16. The gas turbine engine of claim 13, further comprising a guide secured to one of the two case sections and being in a sliding engagement with the other of the two case sections, the guide axially overlapping the bellows.

17. The gas turbine engine of claim 10, wherein the case defines an aperture fluidly connectable to a lubricant circuit of the gas turbine engine for scavenging lubricant, the case sloping radially outwardly toward the aperture.

18. The gas turbine engine of claim 10, wherein the case extends circumferentially all around the central axis to enclose a bearing cavity radially inwardly of the case.

19. A method of operating a bearing assembly, comprising:
radially supporting at least two bearings with at least two bearing supports defined by a case and being axially spaced apart relative to a central axis of a gas turbine engine having an annular gas path;
receiving a first axial load at least at one of the at least two bearings and receiving a second axial load greater than the first axial load at the other of the at least two of the bearings;
deforming bellows of the case located radially inwardly of the annular gas path and connecting the at least two bearing supports together by axially moving the at least two bearings and the at least two bearing supports relative to one another relative to the central axis as a result of a difference between the first axial load and the second axial load, the at least two bearing supports secured to one another via the bellows of the case.

20. The method of claim 19, wherein deforming the bellows includes increasing a size of an overlap between two case sections of the case, two case sections connected to one another via the bellows.

\* \* \* \* \*